Oct. 7, 1941.  S. A. MARTINEK  2,258,513
PULLEY RIM DRIVE FOR SPROCKET WHEELS
Filed Sept. 11, 1940
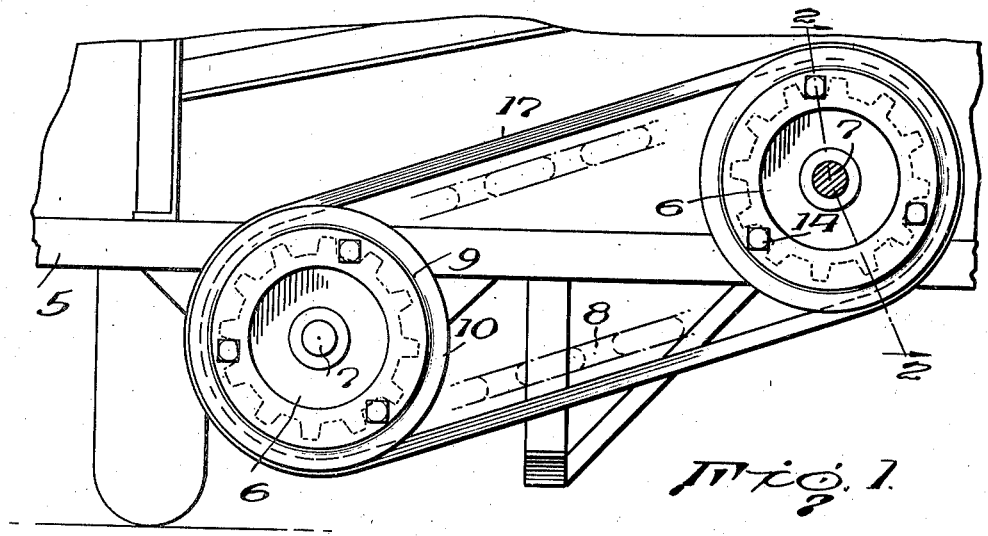
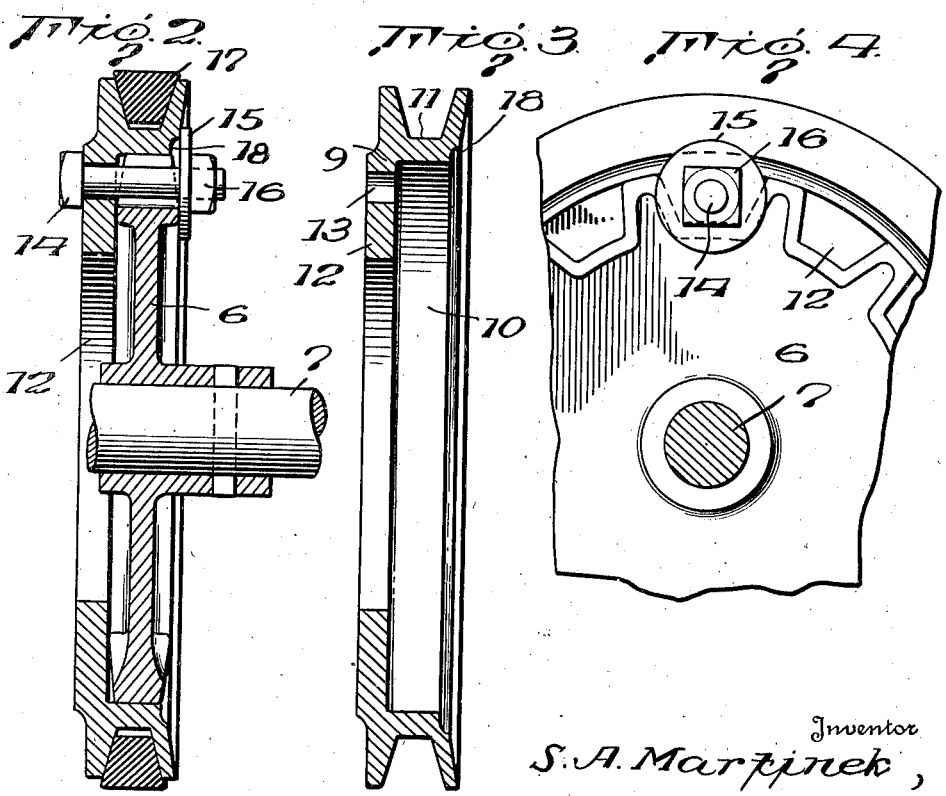
Inventor
S. A. Martinek,
By Bernard F. Garvey
Attorney Patented Oct. 7, 1941

2,258,513

UNITED STATES PATENT OFFICE 2,258,513

PULLEY RIM DRIVE FOR SPROCKET WHEELS

Stanley A. Martinek, Amarillo, Tex., assignor to J. H. Gruver, Gruver, Tex.

Application September 11, 1940, Serial No. 356,380

6 Claims. (Cl. 74—230.5)

This invention consists of a pulley rim drive for sprocket wheels especially adapted for agricultural machinery.

Sprocket chain drives used on agricultural machinery, especially harvesters, have proven unsuitable for universal use in this art and I have, after some experiment, devised drive mechanism applicable to standard sprocket wheels which has proven uniformly efficient and effective.

In carrying out my invention I have found that a pulley rim of especial construction may be mounted on a sprocket wheel of standard construction and used with a belt to transmit the power without loss of operating efficiency and with negligible additional cost.

The device of this invention is also applicable to sprocket wheels which have been rendered unusable due to fractured or broken teeth, the device being capable of facile application to the sprocket wheel without the need of special tools.

Other objects of the invention will be understood from the following description of the present preferred form of the invention taken in connection with the accompanying drawing wherein Fig. 1 is a side elevational view of pulley rims constructed in accordance with the present invention illustrating the application thereof on a harvester, Fig. 2 is a cross sectional view taken on the line 2—2 of Fig. 1 looking in the direction of the arrows, showing to advantage the manner of mounting the pulley rim on a sprocket wheel and also illustrating the application of a belt to the pulley rim, Fig. 3 is a cross sectional view of the pulley rim per se, and Fig. 4 is an enlarged detail fragmentary elevational view of the pulley rim and sprocket wheel.

In order to illustrate the application of my invention, a portion of a harvester 5 is shown which may be of standard design and is equipped with sprocket wheels 6, also of conventional construction. The pulley wheels are keyed to shafts 7, one of which latter may be a drive and the other a driven shaft. The sprocket wheels in normal use have a chain 8 engaged therewith in a manner well known in the art.

The pulley rim of my invention, generally designated 9, consists of a rim body 10, the periphery of which is grooved to provide an annular channel or groove 11 which is preferably of truncated cone shape in cross section. The rim body is provided with an inwardly extending portion which provides a flange 12 in order to prevent lateral displacement of the rim in one direction, in a manner more fully hereinafter set forth. The flange 12 is provided at intervals with openings 13 which are adapted to receive therethrough, bolts 14. The head of each bolt is adapted to impinge against the outer wall of the flange while the bolt shank extends between proximate teeth on the sprocket wheel, the threaded end of the shank being adapted for the reception of a washer 15 and nut 16. A belt 17 is trained over the pulley rims 10 and is of a shape conforming to the contour of the grooves 11 to provide a wedge fit.

In use of this device the pulley rim is adapted to be laterally engaged with a sprocket wheel. By this action the rim slides over the teeth of the sprocket wheel and the inner periphery of the rim body engages the outer terminals of the teeth of the sprocket wheel. The inner wall of the flange 12 abuts one face of the sprocket wheel. Preferably the depth of the flange 12 is in excess of the depth of the teeth of the sprocket wheel to provide a substantial bearing surface. In addition, it wil be noted, especially upon reference to Figs. 2 and 3 of the drawing, that a portion of the outer wall of the flange extends laterally appreciably beyond the outer wall of the rim body. The portion of the rim body on the opposite side, approximately at a point parallel to the juncture of the flange with the rim body, the latter is beveled or undercut to provide a groove 18 as illustrated to advantage in Fig. 2. Consequently, when the washers 15 are in position, one portion of each washer engages the rim beyond the groove 18 while an opposite portion contacts the sprocket wheel at the base of the teeth of the latter, as also illustrated to advantage in Fig. 2. By this arrangement the rim may be positively secured to the sprocket wheel with a minimum expenditure of labor and without the need of any special tools. Furthermore, I have found after experiment that with a rim of this construction all stresses and strains on the rim are completely absorbed without fracture or breakage of either the sprocket wheel or the rim regardless of the load which these parts are called upon to carry.

I am, of course, aware that various changes may be made in this invention within the scope of the claims hereto appended.

What is claimed is:

1. In combination with drive and driven sprocket wheels, a rim mounted over the teeth of each wheel and secured to the latter, and an endless belt trained over said rims.

2. In combination with a sprocket wheel, a grooved rim mounted over the teeth of the sprocket and secured to the sprocket wheel.

3. In combination with a sprocket wheel, a rim, a portion of which circumscribes the teeth of the wheel, another portion of said rim engaging the sprocket wheel teeth at one side of the latter, and means engaging the last mentioned portion of said rim and the teeth of the sprocket wheel to secure the rim body to the latter.

4. Means engageable with a sprocket wheel for transmitting power to or from the latter including, in combination with a sprocket wheel, a rim laterally engageable over the teeth of the sprocket wheel and provided with circumferential belt receiving groove, and means for securing the rim to said wheel.

5. Means engageable with a sprocket wheel for transmitting power to or from the latter including, in combination with a sprocket wheel, a rim laterally engageable over the teeth of the sprocket wheel and provided with a circumferential belt receiving groove, a part of the rim being extended to provide a flange for preventing lateral displacement of the rim in one direction and means engaged through said flange and the teeth of the sprocket wheel to secure the rim from displacement.

6. Means for converting a sprocket wheel into a belt drive including, in combination with a sprocket wheel, a belt receiving means secured over the teeth of the sprocket wheel and frictionally engageable with a belt to prevent slippage of the latter.

S. A. MARTINEK.